US008948284B2

(12) United States Patent
Park et al.

(10) Patent No.: US 8,948,284 B2
(45) Date of Patent: Feb. 3, 2015

(54) METHOD AND APPARATUS OF TRANSMITTING PLCP HEADER FOR SUB 1 GHZ COMMUNICATION

(71) Applicant: LG Electronics Inc., Seoul (KR)

(72) Inventors: Jong Hyun Park, Anyang-si (KR); Eun Sun Kim, Anyang-si (KR); Yun Jung Yi, Anyang-si (KR); Ill Soo Sohn, Anyang-si (KR); Bong Hoe Kim, Anyang-si (KR)

(73) Assignee: LG Elecronics Inc., Seoul (KR)

( * ) Notice: Subject to any disclaimer, the term of this patent is extended or adjusted under 35 U.S.C. 154(b) by 113 days.

(21) Appl. No.: 13/670,324

(22) Filed: Nov. 6, 2012

(65) Prior Publication Data

US 2013/0114757 A1 May 9, 2013

Related U.S. Application Data

(60) Provisional application No. 61/556,760, filed on Nov. 7, 2011.

(51) Int. Cl.

*H04K 1/10* (2006.01)
*H04L 27/28* (2006.01)
*H04L 27/26* (2006.01)

(52) U.S. Cl.

CPC .................................. *H04L 27/2613* (2013.01)
USPC .......................................... 375/260; 375/259

(58) Field of Classification Search

USPC ........................................................ 375/260
See application file for complete search history.

(56) References Cited

U.S. PATENT DOCUMENTS

| | | | | |
|---|---|---|---|---|
| 2005/0163081 | A1* | 7/2005 | Aoki et al. | 370/334 |
| 2011/0051747 | A1* | 3/2011 | Schmidl et al. | 370/474 |
| 2012/0163497 | A1* | 6/2012 | Kim et al. | 375/296 |
| 2012/0201315 | A1* | 8/2012 | Zhang et al. | 375/260 |
| 2012/0201316 | A1* | 8/2012 | Zhang et al. | 375/260 |
| 2012/0263156 | A1* | 10/2012 | Abraham et al. | 370/338 |
| 2014/0029681 | A1* | 1/2014 | Zhang et al. | 375/260 |

* cited by examiner

*Primary Examiner* — Erin File

(74) *Attorney, Agent, or Firm* — Lee, Hong, Degerman, Kang & Waimey

(57) ABSTRACT

Method and apparatus of transmitting PLCP header for sub 1 GHz communication is disclosed. A method of transmitting a physical layer convergence protocol (PLCP) header may comprise generating a short training field (STF) sequence over 1 orthogonal frequency division multiplexing (OFDM) symbol, transforming the STF sequence to repeated waveform patterns in time domain and transmitting the PLCP header comprising the STF sequence, wherein the STF sequence may be a sequence transformed to repeated waveform patterns in time domain by inverse discrete Fourier transform (IDFT).

8 Claims, 7 Drawing Sheets

Legacy PLCP Frame(supporting Legacy nodes)(100)
L-STF (102)
L-LTF (104)
L-SIG (106)
Data (108)
(A)
HT-Green Field PLCP Frame (supporting HT Nodes)(110)
Data HT-LTF(117)
Extension-HT-LTF(117-1)
HT-GF-STF(111)
HT-LTF1 (113)
HT-SIG (115)
HT-LTF
HT-LTF
HT-LTF
Data (119)
CSD + Precoding $Q_k$
(B)
HT-mixed mode PLCP Frame(120)
Data HT-LTF(136)
Extension HT-LTF(136-1)
L-STF (122)
L-LTF (124)
L-SIG (126)
HT-SIG (128)
133
HT-STF
HT-LTF
HT-LTF
HT-LTF
HT-LTF
Data (139)
CSD
CSD + Precoding $Q_k$
(C)

HT NDP Frame(200)
L-STF
L-LTF
L-SIG
HT-SIG1
HT-SIG2
HT-STF
HT-LTFs
PLCP Header(210)
(A)
VHT PPDU Format(220)
230
235
L-STF (222)
L-LTF (224)
L-SIG (226)
VHT-SIG A(228)
VHT-STF
VHT-LTF
VHT-LTF
VHT-SIG B(237)
Data (240)
CSD1
CSD2
Precoding Qk
(B)
VHT-SIG field
VHT-SIG-A1(270)
VHT-SIG-A2(280)
bits :
BW (272)
Reserved
STBC (274)
Group ID (276)
NSTS (278)
Reserved
Short GI (282)
Coding (284)
MCS (286)
Beamformed (287)
Reserved
CRC (288)
Tail (289)
2
1
1
6
12
2
2
2
4
1
2
8
6
VHT-SIG-B(290)
Length
MCS
Reserved
Tail
(C)

METHOD AND APPARATUS OF TRANSMITTING PLCP HEADER FOR SUB 1 GHZ COMMUNICATION

CROSS-REFERENCE TO RELATED APPLICATIONS

Pursuant to 35 U.S.C. §119(e), this application claims the benefit of U.S. Provisional Application No. 61/556,760 filed on Nov. 7, 2011, the contents of which are herein incorporated by reference in its entirety.

FIELD

The example embodiments of the present invention relates to wireless communication and, more particularly, to a method and apparatus for transmitting PLCP header.

DISCUSSION OF THE RELATED ART

A Machine-to-Machine (M2M) system has recently been in the spotlight as the next-generation communication technology. In an IEEE 802.11 WLAN, a new standard is being established in order to support M2M. An M2M system means a network over which a machine not humans becomes the main body of communication and exchanges pieces of information. A temperature sensor, a humidity sensor, a camera, an electric home appliance, such as TV, a process machine in a factory, or a large-sized machine, such as a vehicle, may become one of the elements of an M2M system. With the recent advent of various communication services, such as smart grid, e-Health, and ubiquitous, M2M technology is used a lot in order to support the various communication services. An M2M system has the following characteristics.

1) A very large number of STAs: M2M assumes a very large number of STAs unlike the existing network. This is because not only machines owned by persons, but also sensors installed in homes and companies must be taken into consideration. Accordingly, a very large number of STAs may be connected to one AP.

2) Low traffic load per STA: An M2M terminal has a traffic pattern in which surrounding information is collected and reported. Accordingly, information does not need to be frequently transmitted, and the amount of the information is small.

3) Uplink-oriented: M2M is chiefly configured to receive a command in downlink, take action, and then report resulting data in uplink. Thus, uplink becomes the center in M2M because major data is commonly transmitted in uplink.

4) Longer lifespan of an STA: An M2M terminal is chiefly operated by the battery, and a user may not frequently charge the M2M terminal. Accordingly, it is necessary to guarantee a longer life span by minimizing the consumption of the battery.

5) Automatic recovery function: An M2M terminal needs an automatic recovery function because it is difficult for a person to directly manipulate the M2M terminal in a special situation.

SUMMARY

An object of the example embodiments of the present invention is to provide a method of transmitting the PLCP header of a frame in a frequency band of 1 GHz or lower.

Another object of the example embodiments of the present invention is to provide an apparatus for performing the method of transmitting the PLCP header of a frame in a frequency band of 1 GHz or lower.

To achieve the first object of the example embodiment of the present invention, a method of transmitting a physical layer convergence protocol (PLCP) header may comprise generating a short training field (STF) sequence over 1 orthogonal frequency division multiplexing (OFDM) symbol, transforming the STF sequence to repeated waveform patterns in time domain and transmitting the PLCP header comprising the STF sequence, wherein the STF sequence is a sequence transformed to repeated waveform patterns in time domain by inverse discrete Fourier transform (IDFT). The STF sequence $S_{-26,26}$ may be $$S_{-26,26} = rl;\sqrt{1/2}rlx\{0,0,1+j,0,0,0,-1-j,0,0,0,1+j,0,0,0,-1-j,0,0,0,-1-j,0,0,0,1+j,0,0,0,0,0,0,0,-1-j,0,0,0,-1-j,0,0,0,1+j,0,0,0,1+j,0,0,0,1+j,0,0,0,1+j,0,0\}$$

, wherein each value in the STF sequence is sequentially applied to each subcarrier having index value integer in the range $-26 \le k \le 26$. The method may further comprise generating a long training field (LTF) sequence over 1 OFDM symbol, transmitting the PLCP header further comprising the LTF sequence, wherein the LTF sequence $VHTLTF_{-28,28}$ may be a sequence having a zero tone between non-zero tones. The $VHTLTF_{-28,28}$ may be $$VHTLTF_{-28,28} = \{0,1,LTF_{left},0,LTF_{right},-1,0,1\}$$

$$LTF_{left} = \{0,1,0,-1,0,1,0,1,0,1,0,1,0,1,0,-1,0,1,0,-1,0,-1,0,1,0,1\}$$

$$LTF_{right} = \{1,0,-1,0,1,0,1,0,1,0,-1,0,-1,0,1,0,-1,0,1,0,1,0,1,0,1,0\}$$

and wherein each value in the LTF sequence is sequentially applied to each subcarrier having index value integer in the range $-28 \le k \le 28$. The method may further comprise determining the number of the OFDM symbol used to transmit the STF sequence depend on a transmission bandwidth and determining the number of the OFDM symbol used to transmit the LTF sequence depend on the transmission bandwidth. The method may further comprise boosting transmission power to transmit the STF sequence when the transmission bandwidth is 1 MHz. The PLCP header may be 1/10 downclocked PLCP header, 1/10 downclocked PLCP header transmitted over OFDM symbols having 40 micro second duration per one OFDM symbol.

To achieve the second object of the example embodiments of the present invention, a wireless device configured to transmit physical layer convergence protocol (PLCP) header, the wireless device may comprise a processor configured to generate a STF (short training field) sequence over 1 orthogonal frequency division multiplexing (OFDM) symbol, transform the STF sequence to repeated waveform patterns in time domain and transmit the PLCP header comprising the STF sequence, wherein the STF sequence is a sequence transformed to repeated waveform patterns in time domain by inverse discrete Fourier transform (IDFT). The STF sequence $S_{-26,26}$ may be $$S_{-26,26} = rl;\sqrt{1/2}rlx\{0,0,1+j,0,0,0,-1-j,0,0,0,1+j,0,0,0,-1-j,0,0,0,-1-j,0,0,0,1+j,0,0,0,0,0,0,0,-1-j,0,0,0,-1-j,0,0,0,1+j,0,0,0,1+j,0,0,0,1+j,0,0,0,1+j,0,0\},$$

and wherein each value in the STF sequence is sequentially applied to each subcarrier having index value integer in the range $-26 \le k \le 26$. The processor may be further configured to generate a long training field (LTF) sequence over 1 OFDM symbol, and transmit the PLCP header further comprising the LTF sequence, wherein the LTF sequence $VHTLTF_{-28,28}$ is a sequence having a zero tone between non-zero tones. The $VHTLTF_{-28,28}$ may be $$VHTLTF_{-28,28}=\{0,1,LTF_{left},0,LTF_{right},-1,0,1\}$$

$$LTF_{left}=\{0,1,0,-1,0,1,0,1,0,1,0,1,0,1,0,-1,0,1,0,-1,0,-1,0,1,0,1\}$$

$$LTF_{right}=\{1,0,-1,0,1,0,1,0,1,0,-1,0,-1,0,1,0,-1,0,1,0,1,0,1,0,1,0\};$$

and wherein each value in the LTF sequence may be sequentially applied to each subcarrier having index value integer in the range $-28\leq k\leq 28$. The processor may be further configured to determine the number of the OFDM symbol used to transmit the STF sequence depend on a transmission bandwidth and determine the number of the OFDM symbol used to transmit the LTF sequence depend on the transmission bandwidth. The processor may be further configured to boost transmission power to transmit the STF sequence when the transmission bandwidth is 1 MHz. The PLCP header may be 1/10 downclocked PLCP header, 1/10 downclocked PLCP header transmitted over OFDM symbols having 40 micro second duration per one OFDM symbol.

DETAILED DESCRIPTION OF THE EMBODIMENTS

Hereinafter, the example embodiments of the present invention will be described in detail with reference to the accompanying drawings so that they can be readily implemented by those skilled in the art.

Figure 1:
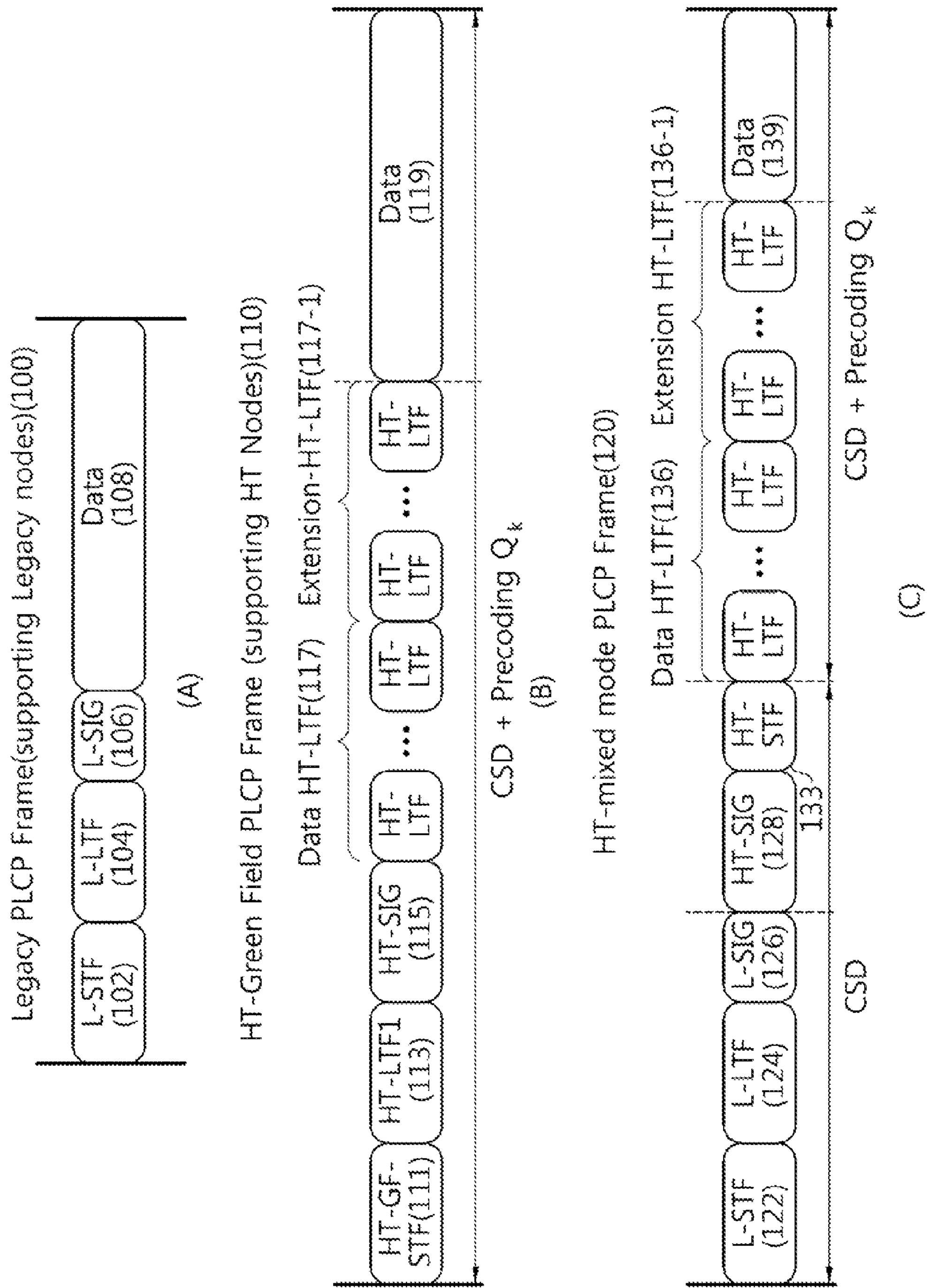
FIG. 1 is a conceptual diagram showing the frame format of a Physical Layer Convergence Procedure (PLCP) Protocol Data Unit (PPDU) defined in the existing IEEE 802.11 standard.

FIG. 1 is a conceptual diagram showing the frame format of a Physical Layer Convergence Procedure (PLCP) Protocol Data Unit (PPDU) defined in the existing IEEE 802.11 standard.

FIG. 1(A) is a conceptual diagram showing a legacy PLCP frame that is used in the IEEE 802.11a, IEEE 802.11b, and IEEE 802.11g standards.

Referring to FIG. 1(A) the legacy PLCP frame 100 includes a Legacy Short Training Field (L-STF) 102, a Legacy Long Training Field (L-LTF) 104, a Legacy Signal (L-SIG) field 106, and a data field (Data) 108.

The L-STF 102 is used for frame timing acquisition and automatic gain control convergence. The L-LTF 104 is used to perform channel estimation for demodulating the L-SIG field 106 and the Data field 108. The L-SIG field 106 includes information necessary to demodulate and decode the subsequent Data field 108.

An IEEE 802.11n High Throughput system, that is, a subsequent standard (hereinafter referred to as an HT system) is also designed to support the legacy PLCP format used in the IEEE 802.11a, 802.11b, and 802.11g standards. In the IEEE 802.11n standard, a frame format that can be used in a system including only an HT STA and a frame format that can be used when a legacy STA used in the existing IEEE 802.11a, 802.11b, and 802.11g standards in IEEE 802.11n and an HT STA newly defined in IEEE 802.11n coexist are separately defined.

FIG. 1(B) is a conceptual diagram showing an HT-Green field PLCP frame 110.

Referring to FIG. 1(B), in the IEEE 802.11n standard, a system including HT STAs only is defined, and a PLCP frame format that can be efficiently used in the system including only HT STAs is newly defined. A PLCP frame format is newly defined as the HT-Green Field PLCP format 110.

The HT-Green Field PLCP frame 110 includes an HT-Green Field Short Training Field (HT-GF-STF) 111, an HT-Long Training Field (HT-LTF) 113, an HT Signal (HT-SIG) field 115, a data HT-LTF 117, an extension 117-1, and a data (Data) field 119. The HT-GF-STF 111 is used to perform frame timing acquisition and automatic gain control convergence. The HT-LTF 113 is used to perform channel estimation for demodulating the HT-SIG field 115 and the Data field 119. The HT-SIG field 115 includes information necessary to demodulated and decode the subsequent Data field 119. The additional HT-LTFs 117 and 117-1 may be additionally included in a frame format when Multiple Input Multiple Output (MIMO) is used. If transmission is performed using MIMO for a plurality of STAs, the additional HT-LTFs 117 and 117-1 may include channel estimation information on each of the STAs.

FIG. 1(C) is a conceptual diagram showing an HT-mixed mode PLCP frame 120.

Referring to FIG. 1(C), the IEEE 802.11n standard supports a PLCP frame designed to support an HT in a system in which a legacy station (hereinafter referred to as a legacy STA) and an HT STA coexist. This frame format is called the HT-mixed mode PLCP frame 120. In the HT-mixed mode PLCP frame 120, in order to support a frame format that can be understood by a legacy STA, an L-STF 122, an L-LTF 124, and an L-SIG field 126 are first transmitted. Next, an HT Signal (HT-SIG) field 128 for transmitting information necessary to demodulate and decode data transmitted for an HT is transmitted. Transmission is performed in a non-beamforming manner up to the HT-SIG field 128 so that a variety of STAs including a legacy STA can receive the information. In an HT-LTF 136 and a data (Data) field 139 that must be transmitted after the HT-SIG field 128, a signal is transmitted through precoding. Here, an HT-Short Training Field (HT-STF) 133 is transmitted so that an STA that receives a data frame through precoding can take a part having varying power due to the precoding into consideration, and HT-LTFs 136 and Data 139 are then transmitted.

Figure 2:
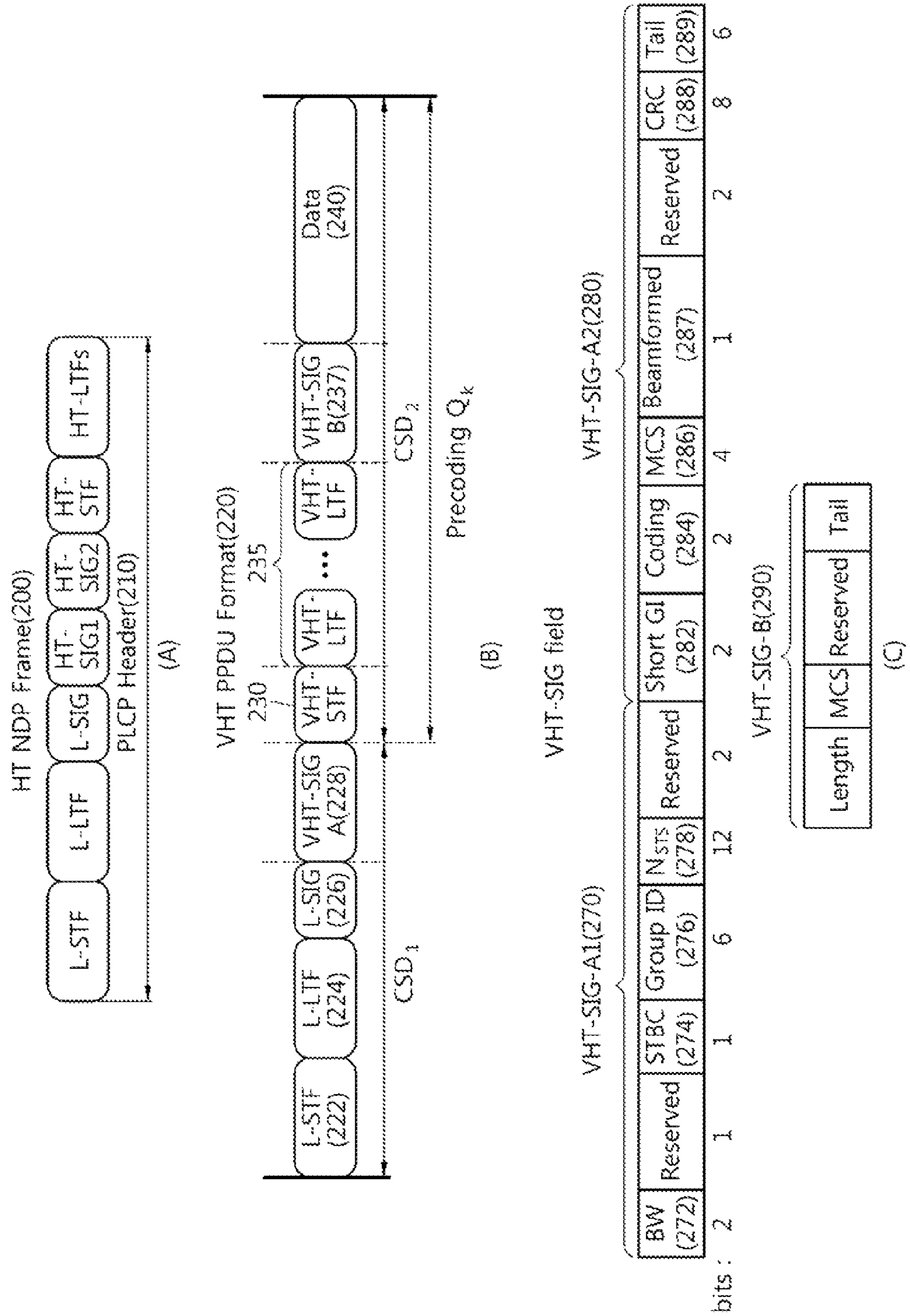
FIG. 2 is a conceptual diagram showing the frame format of a Physical Layer Convergence Procedure (PLCP) Protocol Data Unit (PPDU) defined in the existing IEEE 802.11 standard.

FIG. 2 is a conceptual diagram showing the frame format of a Physical Layer Convergence Procedure (PLCP) Protocol Data Unit (PPDU) defined in the existing IEEE 802.11 standard.

FIG. 2(A) is a conceptual diagram showing an HT NDP frame 200.

Referring to FIG. 2(A), one of the most significant characteristics of an HT system is that a system throughput can be improved by sending several spatial streams using multiple antennas. In the state in which several STAs exist, beamforming to a specific STA that tries to send data is required, and thus a channel sounding scheme is required. The IEEE 802.11n standard supports two types of channel sounding methods. One of the two channel sounding methods is a regular PPDU method including a data field and an MAC header, and the other of the two channel sounding methods is a method using a Null Data Packet (NDP) that does not include a data field. If channel sounding is sought to be performed using an NDP, a PPDU frame in which NDP announcement that announces the NDP has been configured has to be first transmitted.

An NDP frame does not includes a data part and can include only the PLCP header 210 of the frame.

FIG. 2(B) is a conceptual diagram showing a VHT PPDU format 220.

Referring to FIG. 2(B), in an IEEE 802.11ac standard, the VHT PPDU frame 220 has been newly defined. The IEEE 802.11ac is related to a Wireless Local Area Network (WLAN) which supports Very High Throughput (VHT) in a frequency region of 6 GHz or lower. The IEEE 802.11ac standard supports WLAN throughput of 1 Gbps on multiple STAs and supports a maximum throughput of at least 500 Mbps in a link for one STA.

Furthermore, the IEEE 802.11ac standard supports channel bandwidths of 80 MHz and 160 MHz unlike the IEEE 802.11n standard that supports a maximum channel bandwidth of 40 MHz and also supports a non-contiguous channel bandwidth of 80+80 MHz. Unlike the IEEE 802.11n standard that supports a maximum of 64-Quadrature Amplitude Modulation (QAM) in order to support a high throughput of 1 Gbps as compared with the IEEE 802.11n standard supporting a maximum throughput of 450 Mbps, the IEEE 802.11ac standard supports a maximum of 256-QAM. Furthermore, the IEEE 802.11ac standard supports Multiple User (MU)-MIMO unlike the IEEE 802.11n that supports only Signal User (SU)-MIMO.

In the IEEE 802.11ac standard, STAs may have one or more antennas because MU-MIMO is supported. A current IEEE 802.11ac standard supports only downlink MU-MIMO in which a packet is transmitted from an Access Point (AP) to several STAs. Furthermore, when the number of STAs capable of transmitting packets at the same time is a maximum of 4 and a maximum number of spatial streams that can be supported is 8, each STA can use a maximum of 4 streams.

A physical layer for supporting VHT supports MU-MIMO and Orthogonal Frequency Division Multiplexing (OFDM). A VHT physical layer supports a contiguous channel width of 20 MHz, 40 MHz, 80 MHz, and 160 MHz and discontiguous channel width of 80+80 MHz. Each of the subcarriers of the VHT physical layer supports Binary Phase Shift Keying (BPSK), Quadrature Phase Shift Keying (QPSK), 16-QAM, 64QAM, and 256-quadrature Amplitude Modulation (QAM) and also supports coding rates of 1/2, 2/3, 3/4, and 5/6 through Forward Error Correction (FEC) using a convolutional code or a Low-Density Parity-Check (LDPC) code.

In order to transmit a packet in a VHT environment, a PLCP Service Data Unit (PSDU) is produced. A Physical Layer Convergence Procedure (PLCP) preamble is attached to the PSDU, thereby generating a PLCP Protocol Data Unit (PPDU). A PLCP preamble is used for a receiver to demodulate and transfer a PSDU.

The VHT PPDU format 220 includes an L-STF 222, an L-LTF 224, an L-SIG field 226, a VHT-SIG-A field 228, a VHT-STF 230, VHT-LTFs 235, a VHT-SIG-B field 237 field, and a data field 240. The L-STF 222, the L-LTF 224, and the L-SIG field 226 are used in a WLAN before VHT is supported, whereas the VHT-SIG-A field 228, the VHT-STF 230, the VHT-LTFs 235, and the VHT-SIG-B field 237 exist only in VHT packets.

The newly added fields in order to support VHT are described below. First, the VHT-SIG-A field 228 includes pieces of information for describing a VHT format packet and includes pieces of information that are identically necessary for all STAs. The VHT-SIG-A field 228 includes a VHT-SIG-A1 field 270 and a VHT-SIG-A2 field 280. The VHT-SIG-A1 field 270 includes information on the bandwidth (BW) 272 of a used channel, information 274 indicating whether Space Time Block Coding (STBC) is used or not, information on a Group ID 276 indicating a group used for transmission by STAs in grouped MU-MIMO, and information on the number of streams used 278. In contrast, the VHT-SIG-A2 field 280 includes a short Guard Interval (GI) 282, FEC 284, a Modulation and Coding Scheme (MCS) for single user or information on the type of channel coding for multiple users 286, information on beamforming 287, redundancy bits 288 for Cyclic Redundancy Checking (CRC), and the tail bits 289 of a convolutional decoder.

The VHT-STF 230 is used to improve automatic gain control estimation in an MIMO environment, and the VHT-LTF 235 is used to estimate a channel in an MIMO environment. The VHT-SIG-B field 237 is information limited to each STA, and it includes information on the length of a PSDU and an MCS and tail bits.

FIG. 2(C) indicates VHT-SIG-A fields 270 and 280 including two symbols and a VHT-SIG-B field 290 including one symbol. From among them, the detailed contents of fields included in the VHT-SIG-A1 field 270 are described in Table 22-11 fields in the VHT-SIG-A field of Paragraph 22.3.8.2.3 of raft STANDARD for Information Technology—Telecommunications and information exchange between systems—Local and metropolitan area networks—Specific requirements Part 11: Wireless LAN Medium Access Control (MAC) and Physical Layer (PHY) specifications Amendment 4: Enhancements for Very High Throughput for Operation in Bands below 6 GHz, and the detailed contents of fields included in the VHT-SIG-B field 290 are described in Table 22-13 thereof.

In embodiments to be disclosed in the example embodiments of the present invention hereinafter, a physical (PHY) preamble structure for a device operating in a sub 1 GHz band or a Physical Layer Convergence Procedure (PLCP) header are used as the same meaning. The example embodiments of the present invention may be applied to a device that operates in a sub 1 GHz band defined in an IEEE 802.11ah standard or an 802.11 of standard, such as a Machine To Machine (M2M) system. Contents proposed by the example embodiments of the present invention, however, are not limited to an M2M system, but may be applied to common Wireless Local Area Network (WLAN) systems (or Wi-Fi network) in various ways within the essence of the example embodiments of the present invention.

Communication in the sub 1 GHz band has a very wider coverage than a WLAN based on the existing indoor in terms of an electric wave. The frame structure of a physical layer used in the sub 1 GHz band can be simply generated by performing 1/10 down-clocking on a frame structure that is used in the existing IEEE 802.11ac standard. Frames used in channel bandwidths of 20/40/80/160/80+80 MHz in the IEEE 802.11ac standard can be subject to 1/10 down-clocking and used in channel bandwidths of 2/4/8/16/8+8 MHz in the sub 1 GHz band. When the 1/10 down-clocking is performed, a Guard Interval (GI) is increased 10 times from 0.8 μs to 8 μs. Table 1 below shows the amount of data processing according to channel bandwidths when 1/10 down-clocking has not been performed and the amount of data processing according to channel bandwidths when 1/10 down-clocking has been performed.

TABLE 1

| IEEE 802.11 ac PHY | | 1/10 down-clocked S1G PHY 11 ah or 11 af | |
|---|---|---|---|
| CB | Throughput | CB | Throughput |
| 20 MHz | 86.7 Mbps | 2 MHz | 8.67 Mbps |
| 40 MHz | 200 Mbps | 4 MHz | 20 Mbps |
| 80 MHz | 433.3 Mbps | 8 MHz | 43.33 Mbps |
| 160 MHz | 866.7 Mbps | 16 MHz | 86.67 Mbps |
| 80 + 80 MHz | 866.6 Mbps | 8 + 8 MHz | 86.66 Mbps |

Referring to Table 1, it can be seen that the amount of data processing is reduced to 1/10 when a frequency band is reduced to 1/10 and a frame on which 1/10 down-clocking has been performed is used.

In the following, the example embodiments of the present invention, it is assumed that a frame is generated by performing 1/10 down-clocking on an IEEE 802.11ac frame, for convenience of description. In a frame that has been subject to 1/10 down-clocking, duration of one Orthogonal Frequency Division Multiplexing (OFDM) symbol may become 40 μs, that is, 10 times 4 μs, that is, one OFDM symbol duration, in the existing frame on which 1/10 down-clocking has not been performed.

In contrast, a method of generating a the PLCP header proposed by the example embodiments of the present invention may be applied to the PLCP header of an 802.11ac frame that has been subject to down-clocking in another ratio not 1/10 down-clocking, and embodiments for a frame that has been subject to down-clocking in a different ratio are also included in the scope of the example embodiments of the present invention.

A PLCP header can be designed without a need to take backward compatibility into consideration because there is no legacy device that is already operating in the frequency band of a sub 1 GHz (SIG).

In order to use the existing frame in the SIG band, a frame obtained by performing 1/10 down-clocking on the PLCP Protocol Data Unit (PPDU) of an HT-green field format that is disclosed in a 20.3.2 PLCP Protocol Data Unit (PPDU) format of IEEE Standard for Information Technology Telecommunications and information exchange between systems Local and metropolitan area networks Specific requirements Part 11: Wireless LAN Medium Access Control (MAC) and Physical Layer (PHY) Specifications (hereinafter referred to as IEEE 802.11) can be used.

In the following the example embodiments of the present invention, a case where an HT-green field format has been subject to down-clocking is described, for convenience of description, but the embodiments may also be applied to the frame formats described with reference to FIGS. 1 and 2, which is included in the scope of the example embodiments of the present invention.

Figure 3:
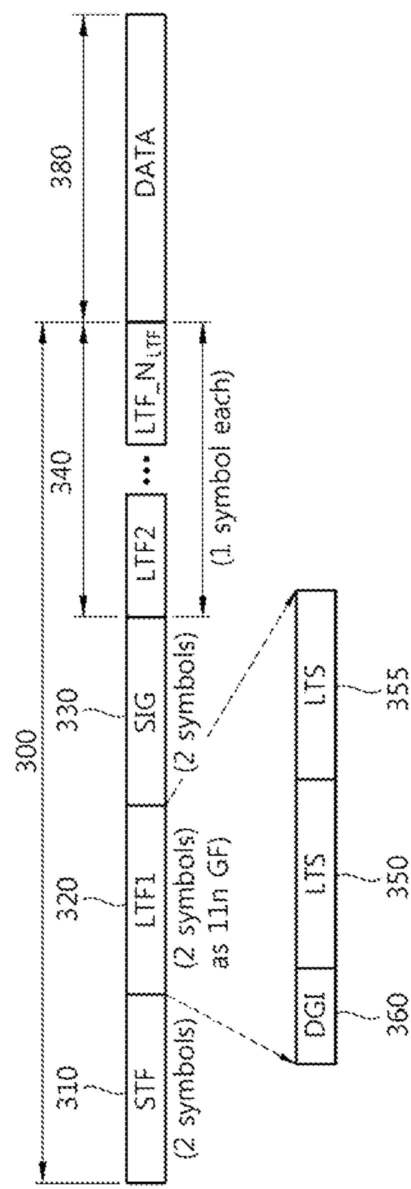
FIG. 3 is a conceptual diagram showing a frame obtained by performing 1/10 down-clocking on an HT-green field format PPDU.

FIG. 3 is a conceptual diagram showing a frame obtained by performing 1/10 down-clocking on an HT-green field format PPDU.

Referring to FIG. 3, the PPDU of the 1/10 down-clocked HT-green field format may include a PLCP header 300 and a data payload 380. The PLCP header 300 may include a Short Training Field (STF) 310, a Long Training Field1 (LTF1) 320, an SIG field 330, and LTF2~LTF_N 340. The definition of each field and information included in each field are disclosed in an HT-green field format preamble in Paragraph 20.3.9.5 of IEEE 802.11. An object of each field is described in brief. Each field may have the following object.

The STF 310 can be used to perform automatic gain control estimation, timing acquisition, and coarse Carrier Frequency Offset (CFO) estimation.

The LTF1 320 and the LTF2~LTF_N 340 can be used to perform channel estimation and fine CFO estimation. An LTF having two OFDM symbols may include two Long Term Symbols (LTSs) 350 and 355 and a guard interval 360.

The LTF1 320 can be used to demodulate the data payload 380 of the PPDU. The LTF2~LTF_N 340 can be used for channel estimation for each channel on which a space-time stream is transmitted when Multiple Input Multiple Output (MIMO) is used. The number of LTF2~LTF_N 340 included in the PLCP header can be determined by the number of space-time streams used when MIMO is used.

The SIG field 330 may include pieces of information for analyzing an HT packet format. For example, various pieces of information for analyzing an HT packet, such as a Modulation and Coding Scheme (MCS), a channel bandwidth, and a FEC coding scheme, may be included in the SIG field 330.

Each of the STF 310 and the LTF1 320 may have symbol duration having 2 OFDM symbols. If 1/10 down-clocking is performed, one OFDM symbol has duration of 40 μs. Thus, the STF 310 and the LTF1 320 anterior to the SIG field 330 have symbol duration corresponding to a total of 160 μs.

If the PLCP header 300 has a long training period before the SIG field 330 as described above, the use efficiency of a medium can be greatly reduced due to the allocation of unnecessary OFDM symbols. That is, there is a need for a method of increasing the use efficiency of a medium by reducing symbol duration, allocated to the STF 310 and the LTF1 320, to a maximum extent as long as performance is not deteriorated in performing the main object (i.e., Automatic Gain Control (AGC) and coarse Carrier Frequency Offset (CFO) estimation) of the STF 310 and the main object (i.e., fine CFO estimation and channel estimation) of the LTF1 320.

An embodiment of the example embodiments of the present invention discloses a method of reducing symbol duration allocated to the STF 310 and the LTF1 320 without deteriorating performance.

In the embodiment of the example embodiments of the present invention, the following methods may be used as a method of reducing symbol duration allocated to an STF or LTF in the PPDU of a 1/10 down-clocked HT-green field format while not deteriorating performance.

(1) A method of configuring the STF 310 using only 1 OFDM symbol.

(2) A method of configuring the LTF1 320 using only 1 OFDM symbol so that the time-domain waveform of an LTF has a self-repeated form in the 1 OFDM symbol.

(3) A method of configuring the STF 310 using 1 OFDM symbol so that the time-domain waveform of an LTF has a self-repeated formed in the 1 OFDM symbol.

The use efficiency of a medium can be increased by reducing symbol duration allocated to the STF 310 and the LTF1 320 that are included in the PLCP header using at least one of the methods (1) to (3).

Figure 4:
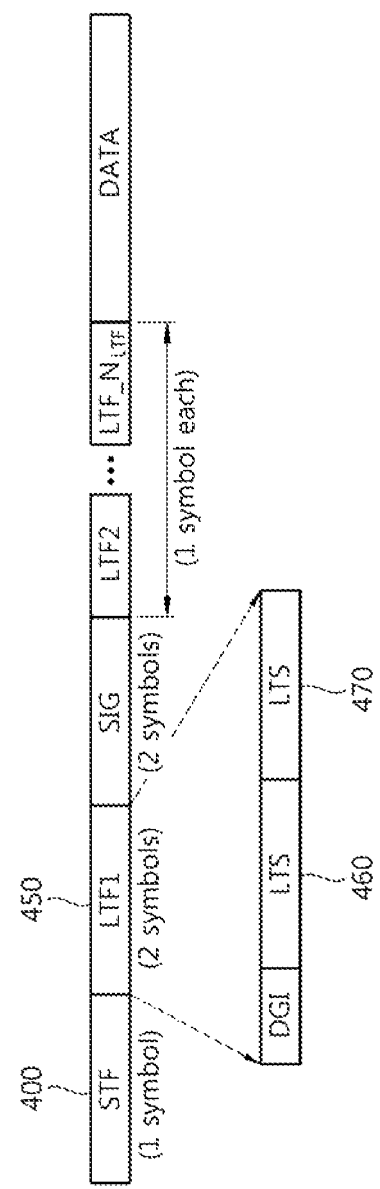
FIG. 4 is a conceptual diagram showing a PLCP header in accordance with the example embodiments of the present invention.

FIG. 4 is a conceptual diagram showing a PLCP header in accordance with an embodiment of the example embodiments of the present invention.

Referring to FIG. 4, an STF 400 may have symbol duration of 1 OFDM symbol.

First, if the STF 400 is allocated to 1 OFDM symbol, symbol duration allocated to the STF 400 may become 40 μs corresponding to 1 symbol time interval. That is, if 1/10 down clocking is simply performed, the OFDM symbol duration may be half that of a case where 2 symbols are allocated to the STF 400.

1-OFDM symbol duration in an SIG band has a value that has been increased by 10 times as compared with the existing IEEE 802.11n/ac standards. Accordingly, the use efficiency of a medium can be increased by only the symbol duration of 40 μs. An STF sequence design may reuse the STF sequence of the existing 802.11n/ac standards.

Equation 1 below is a table showing an STF sequence when the STF included in the PLCP header of the HT-green field format PPDU in accordance with an embodiment of the example embodiments of the present invention has been subject to 1/10 down-clocking.

$$S_{-26,26}= rl;\sqrt{1/2}rlx\{0,0,1+j,0,0,0,-1-j,0,0,0,1+j,0,0,0,-1-j,0,0,0,-1-j,0,0,0,1+j,0,0,0,0,0,0,0,-1-j,0,0,0,-1-j,0,0,0,1+j,0,0\ 0,1+j,0,0,0,1+j,0,0,0,1+j,0,0\} \quad \text{<Equation 1>}$$

Referring to Equation 1, if the STF sequence is applied to a 1/10 down-clocked SIG 2 MHz channel (a guard tone can be shifted), a time-domain waveform that has been repeated four times for each 8 μs when the STF sequence is transformed in the time axis according to an Inverse Fast Fourier Transform (IFFT) can be obtained. Here, if a cyclic prefix is inserted into the STF sequence, a Guard Interval (GI) having duration of 8 μs can also be included.

That is, the 1-symbol STF may have a waveform (a total of 40 μs) that has been repeated 5 times for each 8 μs in the time domain.

When taking symbol duration increased 10 times in the S1G into consideration, the absolute time interval 40 μs of the 1-symbol STF is at least 5 times greater than 8 μs, that is, the absolute time of the STF allocated to 2 symbols in the existing 802.11n/ac systems. Accordingly, the deterioration of performance may not occur even when the STF is allocated to 1 OFDM symbol because an initial power control operation can be performed for a sufficient time interval in terms of Automatic Gain Control (AGC) performance.

Furthermore, from a viewpoint of Carrier Frequency Offset (CFO) estimation, if a time-domain waveform has a 5-repetition pattern as in the STF sequence, the deterioration of performance may not occur because coarse CFO estimation can be performed through the repetition pattern waveform that remains after Automatic Gain Control (AGC) is performed for the initial duration. Furthermore, since a fine CFO is additionally estimated through an LTF 420 subsequent to the STF 400, a finer Carrier Frequency Offset (CFO) can be further estimated in the LTF 420 although performance in the STF is deteriorated.

An LTF1 450 is allocated to 2 OFDM symbols. In the LTF1 450, each Long Term Symbol (LTS) time interval is set to 32 μs, and a fine CFO having an interval of 32 μs can be estimated using two repeated LTS waveforms 460 and 470.

Figure 5:
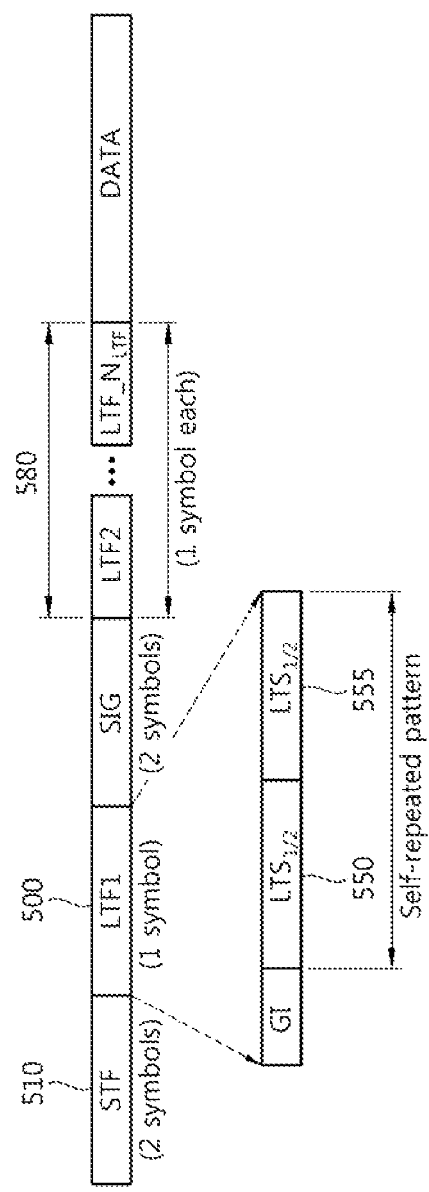
FIG. 5 is a conceptual diagram showing a PLCP header in accordance with the example embodiments of the present.

FIG. 5 is a conceptual diagram showing a PLCP header in accordance with an embodiment of the example embodiments of the present invention.

Referring to FIG. 5, an LTF1 500 can be configured using only 1 OFDM symbol. OFDM symbol duration can be reduced by 40 μs as compared with a case where the existing LTF symbol includes 2 symbols. In order to allocate the LTF1 500 within the 1 OFDM symbol, an LTF sequence having a form in which the existing LTF sequence has been subject to nulling/puncturing at an interval of 2 tones can be used. If the LTF sequence having a form in which the existing LTF sequence has been subject to nulling/puncturing at an interval of 2 tones is used, the LTF1 500 has a self-repeated pattern in the 1 OFDM symbol. In the LTF1 500 having the self-repeated pattern, a CFO can be more precisely performed than a CFO estimated in an STF 510.

Equation 2 shows an LTF sequence that has been subject to nulling/puncturing at an interval of 2 tones in order to insert an LTF interval.

$$VHTLTF_{-28,28}=\{0,1,LTF_{left},0,LTF_{right},-1,0,1\}$$

$$LTF_{left}=\{0,1,0,-1,0,1,0,1,0,1,0,1,0,1,0,-1,0,1,0,-1,0,-1,0,1,0,1\}$$

$$LTF_{right}=\{1,0,-1,0,1,0,1,0,1,0,-1,0,-1,0,1,0,-1,0,1,0,1,0,1,0,1,0\} \quad \text{<Equation 2>}$$

Referring to Equation 2, the LTF sequence can be generated in a form in which a zero has been inserted between non-zero tones every tone. After the LTF sequence is generated by inserting zero between non-zero tones at an interval of 1 tone, a waveform has a "self-repeated pattern" when the waveform is transformed in the time domain unlike the existing waveform. That is, the LTF1 500 can include a 2-repetition waveform in one OFDM symbol.

The LTF sequence disclosed in Equation 2 is only an example. In accordance with an embodiment of the example embodiments of the present invention, the scope of the example embodiments of the present invention can include an LTF generated using another LTF sequence in which zero is inserted between non-zero tone every 1 tone, thus having the time domain waveform of a self-repeated pattern in 1 OFDM symbol.

Long Term Symbols $(LTSs)_{1,2}$ 550 and 555, that is, a repeated pattern, have duration of 16 μs because symbol duration used in the existing 802.11 n/ac standards has been increased 10 times in the SIG band. That is, a CFO can be estimated at an interval of 16 μs using the two waveforms of the repeated $LTS_{1/2}$ 550 and 555.

Channel bandwidths taken into consideration in the SIG band are 1/2/4/8/16 MHz, and a narrow channel bandwidth that is 10 times smaller than the channel bandwidth in the existing 802.11n/ac standards can be used as the channel bandwidths taken into consideration in the SIG band. Accordingly, even when an LTF sequence having a nulling/puncturing form at an interval of 2 tones is used, performance is not deteriorated as compared with a case where a CFO is estimated for all subcarrier indices.

In general, when calculating the average channel estimation value of all channel bandwidths without using a channel estimation value for each tone, the number of averaging samples is reduced by half. For example, in the case of a bandwidth of 2 MHz using a 64 FFT, only symbol duration can be reduced without deteriorating performance because there a sufficient number of averaging tones for calculating a channel estimation value although the LTF sequence having a nulling/puncturing at an interval of 2 tones is used.

Additionally, if MIMO is used and an HT-green field format PPDU is transmitted, an LTF2 to an LTF_N 580 can be included in the PLCP header of the HT-green field format PPDU. As described above, each of the LTF2~LTF_N 580 can be allocated to 1 OFDM symbol so that a waveform has a self-repeated pattern in each symbol in the time domain.

Figure 6:
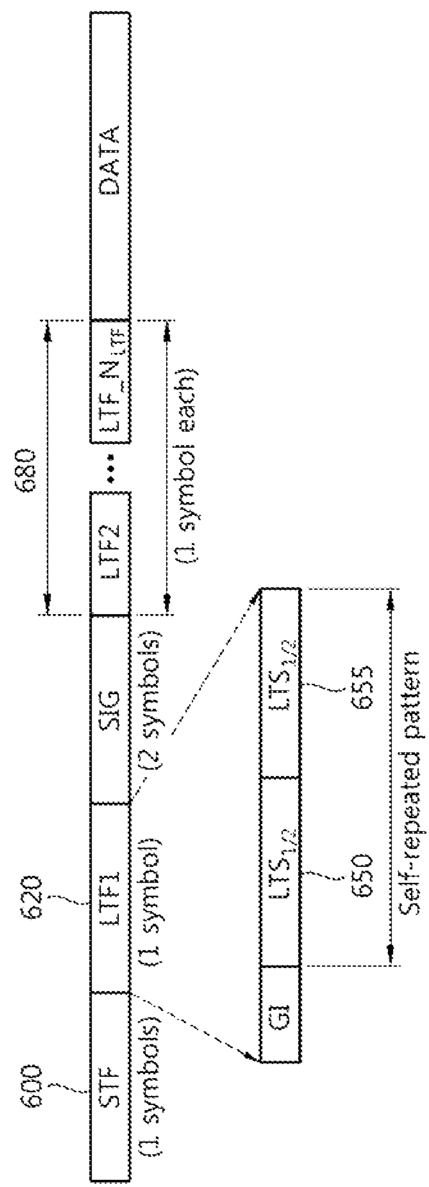
FIG. 6 is a conceptual diagram showing a PLCP header in accordance with the example embodiments of the present invention.

FIG. 6 is a conceptual diagram showing a PLCP header in accordance with an embodiment of the example embodiments of the present invention.

Referring to FIG. 6, each of an STF 600 and an LTF1 620 may be configured using 1 OFDM symbol.

In the case of the STF 600, like in the method of FIG. 4, the STF 600 can be allocated to 1 OFDM symbol so that it has five-repeated waveforms. Equation 1 may be used as an STF sequence.

In the case of the LTF1 620, like in the method of FIG. 5, the LTF1 620 can be allocated to 1 OFDM symbol so that it has a waveform having a self-repeated pattern in the time domain. The LTF1 620 can be generated using an LTF sequence having a nulling/puncturing form at an interval of 2 tones as in Equation 2. The Long Term Symbols $(LTSs)_{1,2}$ 650 and 655 of the generated LTF 620, that is, the repeated pattern, can have duration of 16 μs. That is, a fine CFO can be estimated at an interval of 16 μs using the two waveforms of the $LTSs_{1/2}$ 650 and 655.

If a frame is transmitted using MIMO, each of an LTF2 to an LTF_N 680 can be allocated to 1 OFDM symbol so that it has a waveform having a self repeated pattern in the time domain.

In accordance with an embodiment of the example embodiments of the present invention, the frame structures disclosed in FIGS. 2 to 4 can be selectively used depending on different channel bandwidths.

For example, in relation to a channel bandwidth of 2 MHz or higher, the 1-symbol STF described with reference to FIG. 4 and a preamble using the 1-symbol LTF can be used. In relation to a 1-MHz channel having a narrower band, the 1-symbol STF described with reference to FIGS. 2 and 3 and a preamble using the 2-symbol LTF or a 2-symbol STF and a preamble using the 1-symbol LTF may be used. In particular, in relation to a 1-MHz channel, since an STF symbol part is boosted by, for example, 3 dB, an STF part becomes more robust, and thus it can be used in long-range communication.

In accordance with an embodiment of the example embodiments of the present invention, the methods of reducing symbols, allocated to an STF and LTF included in a PLCP header in a frame in which an HT-green field format PPDU has been subject to 1/10 down-clocking, by half have been described. The methods can also be applied to other frame formats.

For example, each of the L-STF 102 and the L-LTF 104 of the legacy PLCP frame format described with reference to FIG. 1 may have 1 symbol, and each of the L-STF 122, the L-LTF 124, the HT-STF 133, and the HT-LTF 136 of the HT-mixed mode PLCP frame format described with reference to FIG. 1 can be generated to have 1 symbol.

Furthermore, each of the L-STF, the L-LTF, the HT-STF, and the HT-LTF of the HT NDP Frame and the L-STF 222, the L-LTF 224, the VHT-STF 230, and the VHT-LTF 235 of the VHT PPDU Format described with reference to FIG. 2 can be generated to have 1 symbol.

In the case of a field having a field sequence for which a self-repeated pattern cannot be generated using the existing field sequence, the field can have OFDM duration corresponding to 1 symbol using a sequence of a nulling/puncturing form at an interval of 2 tones in the existing field sequence.

Figure 7:
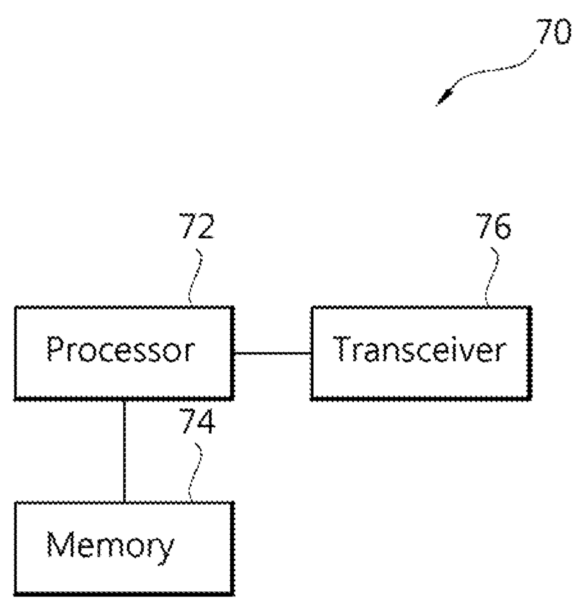
FIG. 7 is a block diagram showing a wireless apparatus to which the example embodiments of the present invention can be applied.

FIG. 7 is a block diagram showing a wireless apparatus to which an embodiment of the example embodiments of the present invention can be applied.

The wireless apparatus 70 is a terminal capable of embodying the above-described embodiments and may be an AP or a non-AP STA.

The wireless apparatus 70 includes a processor 72, memory 74, and a transceiver 76. The transceiver 76 is configured to transmit/receive radio signals, and the physical layer of IEEE 802.11 is embodied in the transceiver 76. The processor 72 is functionally connected to the transceiver 76 and configured to embody the MAC layer and physical layer of IEEE 802.11. The processor 72 can generate at least one of a paging frame, a wakeup frame, and a wakeup negotiation frame in accordance with an embodiment of the example embodiments of the present invention, and each of the frames can include the pieces of information disclosed in the embodiments of the example embodiments of the present invention. The processor 72 can be configured to embody the embodiments of the example embodiments of the present invention.

The processor 72 and/or the transceiver 76 can include Application-Specific Integrated Circuits (ASICs), other chipsets, logic circuits and/or data processors. The memory 74 may include Read-Only Memory (ROM), Random Access Memory (RAM), flash memory, memory cards, storage media and/or other storage devices. When the above-described embodiment is embodied in software, the above-described scheme may be embodied into a module (process or function) that performs the above function. The module may be stored in the memory 74 and executed by the processor 72. The memory 74 may be placed inside or outside the processor 72 and may be connected to the processor 72 using a variety of well-known means.

In accordance with the method and apparatus for generating a Physical Layer Convergence Procedure (PLCP) header in a 1 GHz frequency band or lower in accordance with the embodiments of the example embodiments of the present invention, the use efficiency of a medium can be increased because unnecessary OFDM symbols are not allocated to a preamble by reducing the number of symbols of some fields included in the PLCP header.

What is claimed is:

1. A method of transmitting training fields for wireless local area network, the method comprising:

determining a short training field (STF) sequence and a number of at least one first orthogonal frequency division multiplexing (OFDM) symbol for the STF sequence based on a size of a channel bandwidth in a sub 1 GHz frequency band;

determining a long training field (LTF) sequence and a number of at least one second OFDM symbol for the LTF sequence based on the size of the channel bandwidth in the sub 1 GHz frequency band;

transmitting the STF sequence on the at least one first OFDM symbol; and transmitting the LTF sequence on the at least one second OFDM symbol, wherein the size of the channel bandwidth is 1 MHz, 2 MHz, 4 MHz, 8 MHz, 16 MHz or 8+8 MHz in the sub 1 GHz frequency band, and wherein the at least one first OFDM symbol and the at least one second OFDM symbol are 1/10 down-clocked OFDM symbols having a duration of 40 micro-second.

2. The method of claim 1, wherein the LTF sequence is the sequence of alternating 0 s and ±1 s if the size of the channel bandwidth is equal to or greater than 2 MHz, wherein the LTF sequence transformed based on the inverse discrete Fourier transform (IDFT) is a waveform having a self-repeated pattern in the time domain if the size of the channel bandwidth is equal to or greater than 2 MHz, wherein the STF sequence transformed based on the IDFT is a waveform having a 5 times-repeated pattern in a time domain if the size of the channel bandwidth is equal to or greater than 2 MHz, wherein the number of the at least one first OFDM symbols is one if the size of the channel bandwidth is equal to or greater than 2 MHz, and wherein the number of the at least one second OFDM symbol is one if the size of the channel bandwidth is equal to or greater than 2 MHz.

3. The method of claim 2, wherein if the size of the channel bandwidth is equal to or greater than 2 MHz, the LTF sequence $VHTLTF_{-28,28}$ is defined by {0, 1, $LTF_{left}$, 0, $LTF_{right}$, −1, 0, 1}, where $LTF_{left}$={0, 1, 0, −1, 0, 1, 0, 1, 0, 1, 0, 1, 0, 1, 0, −1, 0, 1, 0, −1, 0, −1, 0, 1, 0, 1} and $LTF_{right}$={1, 0, −1, 0, 1, 0, 1, 0, 1, 0, −1, 0, −1, 0, 1, 0, −1, 0, 1, 0, 1, 0, 1, 0, 1, 0}.

4. The method of claim 3, wherein the STF sequence transformed based on the IDFT is a waveform having a 5 times-repeated pattern in a time domain if the size of the channel bandwidth is 1 MHz, the number of the at least one first OFDM symbols is one if the size of the channel bandwidth is 1 MHz, the number of the at least one second OFDM symbols is two if the size of the channel bandwidth is 1 MHz.

5. A wireless device transmitting a training field for wireless local area network, the wireless device comprising:

a radio frequency (RF) unit configured to transmit or receive a radio signal; and a processor operatively coupled with the RF unit and configured to:

determine a short training field (STF) sequence, a number of at least one first orthogonal frequency division multiplexing (OFDM) symbol for the STF sequence based on a size of a channel bandwidth in a sub 1 GHz frequency band;

determine a long training field (LTF) sequence, a number of at least one second OFDM symbol for the LTF sequence based on the size of the channel bandwidth in the sub 1 GHz frequency band;

instruct the RF unit to transmit the STF sequence on the at least one first OFDM symbol; and instruct the RF unit to transmit the LTF sequence on the at least one second OFDM symbol, wherein the size of the channel bandwidth is 1 MHz, 2 MHz, 4 MHz, 8 MHz, 16 MHz or 8+8 MHz in the sub 1 GHz frequency band, and wherein the at least one first OFDM symbol and the at least one second OFDM symbol are 1/10 down-clocked OFDM symbols having a duration of 40 micro-second.

6. The wireless device of claim 5, wherein the LTF sequence is the sequence of alternating 0 s and ±1 s if the size of the channel bandwidth is equal to or greater than 2 MHz, wherein the LTF sequence transformed based on the inverse discrete Fourier transform (IDFT) is a waveform having a self-repeated pattern in the time domain if the size of the channel bandwidth is equal to or greater than 2 MHz, wherein the STF sequence transformed based on the IDFT is a waveform having a 5 times-repeated pattern in a time domain if the size of the channel bandwidth is equal to or greater than 2 MHz, wherein the number of the at least one first OFDM symbols is one if the size of the channel bandwidth is equal to or greater than 2 MHz, and wherein the number of the at least one second OFDM symbol is one if the size of the channel bandwidth is equal to or greater than 2 MHz.

7. The wireless device of claim 6, wherein if the size of the channel bandwidth is equal to or greater than 2 MHz, the LTF sequence $VHTLTF_{-28,28}$ is defined by {0, 1, $LTF_{left}$, 0, $LTF_{right}$, −1, 0, 1}, where $LTF_{left}$={0, 1, 0, −1, 0, 1, 0, 1, 0, 1, 0, 1, 0, 1, 0, −1, 0, 1, 0, −1, 0, −1, 0, 1, 0, 1} and $LTF_{right}$={1, 0, −1, 0, 1, 0, 1, 0, 1, 0, −1, 0, −1, 0, 1, 0, −1, 0, 1, 0, 1, 0, 1, 0, 1, 0}.

8. The wireless device of claim 7, wherein the STF sequence transformed based on the IDFT is a waveform having a 5 times-repeated pattern in a time domain if the size of the channel bandwidth is 1 MHz, wherein the number of the at least one first OFDM symbols is one if the size of the channel bandwidth is 1 MHz, and wherein the number of the at least one second OFDM symbols is two if the size of the channel bandwidth is 1 MHz.

* * * * *